(12) United States Patent
Jordan et al.

(10) Patent No.: US 7,921,027 B2
(45) Date of Patent: Apr. 5, 2011

(54) CONSTRAINT-BASED PRODUCTION PLANNING AND SCHEDULING

(75) Inventors: David Jordan, Radstock (GB); Brian Taylor, Camberley (GB); Paul Johnston, Leeds (GB)

(73) Assignee: JDA Software Group, Inc., Scottsdale, AZ (US)

( * ) Notice: Subject to any disclaimer, the term of this patent is extended or adjusted under 35 U.S.C. 154(b) by 0 days.

(21) Appl. No.: 12/842,813

(22) Filed: Jul. 23, 2010

(65) Prior Publication Data

US 2010/0287020 A1 Nov. 11, 2010

Related U.S. Application Data

(62) Division of application No. 10/428,006, filed on May 2, 2003.

(60) Provisional application No. 60/377,252, filed on May 2, 2002.

(51) Int. Cl.
*G06F 9/46* (2006.01)
(52) U.S. Cl. ............................................. 705/8; 705/9
(58) Field of Classification Search .................. 705/8, 9
See application file for complete search history.

(56) References Cited

U.S. PATENT DOCUMENTS

| | | | |
|---|---|---|---|
| 5,111,391 A | 5/1992 | Fields et al. | |
| 5,212,791 A | 5/1993 | Damian et al. | |
| 5,233,533 A | 8/1993 | Edstrom et al. | |
| 5,369,570 A | 11/1994 | Parad | |
| 5,432,887 A | 7/1995 | Khaw | |
| 5,596,502 A | 1/1997 | Koski et al. | |
| 5,619,695 A | 4/1997 | Arbabi et al. | |
| 5,787,000 A | 7/1998 | Lilly et al. | |
| 5,826,236 A | 10/1998 | Narimatsu et al. | |
| 5,860,067 A | 1/1999 | Onda et al. | |
| 6,216,109 B1 | 4/2001 | Zweben et al. | |
| 6,411,922 B1 | 6/2002 | Clark et al. | |
| 6,415,194 B1 | 7/2002 | Gleditsch et al. | |
| 6,415,195 B1 | 7/2002 | Gleditsch et al. | |
| 6,591,153 B2 | 7/2003 | Crampton et al. | |
| 2004/0128176 A1 | 7/2004 | Jordan et al. | |

OTHER PUBLICATIONS

"Forward-backward algorithm," in Wikipedia, The Free Encyclopedia, retrieved 21:56, Aug. 20, 2009, from http://en.wikipedia.org/w/index.php?title=Forward-backward_algorithm&oldid=309142547, 5 pages.
U.S. Appl. No. 12/842,835, filed Jul. 23, 2010, Jordan et al.
International Search Report for International (PCT) Application No. PCT/US03/13723, mailed Mar. 12, 2004.

(Continued)

*Primary Examiner* — Johnna R Loftis
(74) *Attorney, Agent, or Firm* — Booth Udall, PLC; Steven J. Laureanti (57) ABSTRACT

The present invention is a constraint-based planning tool that specifically addresses the needs of complex discrete and process industries by providing a computationally efficient method and system for fulfillment of customer orders in a supply chain. By comprehensively synchronizing and optimizing the flow of materials through the enterprise, the present invention creates a feasible plan for manufacturing operations that simultaneously optimizes both material and capacity constraints by planning and scheduling multiple customer orders, planning for use the various resources located in remote locations needed to fulfill such orders, and scheduling the used resources for replenishment at appropriate times so that the resources meet the needs of the orders.

16 Claims, 7 Drawing Sheets

OTHER PUBLICATIONS

Official Action for U.S. Appl. No. 10/428,006, mailed Jun. 25, 2010.
Official Action for U.S. Appl. No. 10/428,006, mailed Nov. 17, 2009.
Official Action for U.S. Appl. No. 10/428,006, mailed Aug. 28, 2009.
Official Action for U.S. Appl. No. 10/428,006, mailed Mar. 3, 2009.
Official Action for U.S. Appl. No. 10/428,006, mailed Sep. 18, 2008.
Official Action for U.S. Appl. No. 10/428,006, mailed Nov. 16, 2007.
Notice of Allowance and Fee(s) Due for U.S. Appl. No. 10/428,006, mailed Oct. 1, 2010, 9 pages.
Alvord, Charles H. III, "The S in APS", IIE Solutions, vol. 31, No. 10, Oct. 1999, 8 pages.
Gartner, Betsy, "Walsh Automation's production scheduling application at Novartis wins 'Best Presentation' award at Gensym's users' society meeting", Gensym Corp., Business Wire, May 13, 1997, 3 pages.
Anonymous, "Eshuis achieves total optimization of people, material, and equipment", IIE Solutions, vol. 28, No. 11, Nov. 1996, 4 pages.

CONSTRAINT-BASED PRODUCTION PLANNING AND SCHEDULING

CROSS-REFERENCE TO RELATED APPLICATIONS

This application is a divisional of U.S. application Ser. No. 10/428,006, filed May 2, 2003, which claims priority from U.S. Provisional Application No. 60/377,252, "Constraint-Based Production Planning and Scheduling," filed May 2, 2002, each of which are hereby incorporated by reference.

BACKGROUND OF THE INVENTION

1. Field of the Invention

The present invention relates to a system and method for planning and scheduling customer orders. More specifically, the present invention relates to a computationally efficient method and system for fulfillment of customer orders in a supply chain by planning and scheduling multiple customer orders, planning for use the various resources located in remote locations needed to fulfill such orders, and scheduling the used resources for replenishment at appropriate times so that the resources meet the needs of the orders.

2. Discussion of the Related Art

Today's business environment is more competitive than ever before. Increasingly demanding customers and the surge of strong global competition require reduced manufacturing cycle times and increased customization of products and services—all in addition to the traditional allocation challenges of constrained resources. Manufacturers are faced with volatile demand, reduced product life cycles, complex supply chains, and shrinking margins. To survive, they must have the ability to satisfy customer demand while maximizing profits, but traditional methods fall short of providing the modeling, optimization, and analysis tools required to manage these complex manufacturing environments. When the right materials are not available when and where they are needed, many companies experience manufacturing delays, expediting costs, higher material costs, and poor customer service.

The production planning tools that have been developed in an attempt to address these business needs generally require complex models and analysis of production environments and the supporting processes. The most comprehensive algorithm-based analysis methods require levels of computation that preclude modeling of an entire production process in a dynamic environment. Heuristic planning tools provide a less computationally intensive solution to plant optimization models; but many sacrifice the ability to model key features of complex plant operations such as use of tank-type resources, personnel variations, rescheduling after material delays, and T-plant type modeling. Thus, there remains a need in the art for a computationally efficient method and system for planning and scheduling multiple customer orders that provides advanced modeling of production processes.

BRIEF SUMMARY OF THE INVENTION

Accordingly, the present invention relates to a computationally efficient method and system for fulfillment of customer orders in a supply chain by planning and scheduling multiple customer orders, planning for use the various resources located in remote locations needed to fulfill such orders, and scheduling the used resources for replenishment at appropriate times so that the resources meet the needs of the orders.

Broadly described, the present invention is a constraint-based planning tool that specifically addresses the needs of complex discrete and process industries. By comprehensively synchronizing and optimizing the flow of materials through the enterprise, the present invention creates a feasible plan for manufacturing operations that simultaneously optimizes both material and capacity constraints. As a result, purchasing and production may be coordinated with demand, ensuring that the right materials arrive at the right time in the manufacturing process. Furthermore, the present invention may quickly identify the operation's constraints and provides planners with the tools to make decisions on how to best resolve the issues. Through a powerful and flexible algorithm, the present invention gives the planner control over the priorities of the business through dynamic prioritization. Dynamic prioritization may consider management policies such as customer service, throughput, and inventory on work to be produced, as well as the constraints and supporting costs confronting management.

In one implementation, the present invention builds a realistic picture of the business through its advanced modeling techniques. Specifically, the present invention maintains a full database of available resources, both mechanical and human. Each resource can have specified substitutes and linked auxiliary resources—such as fixtures, tools, and inspectors—that are required together to complete an operation. The full bill of material may be considered along with specified substitutes and any alternative routes needed to handle them. The present invention may further apply rules to assist in the modeling of particular physical aspects of plant operations, such as cyclic and continuous flow production, time- and cost-based dependent set up, time per part or per batch operations, permissions to start work, uninterruptible processes, and rework and scrap rate.

Overall, the present invention provides the advanced modeling required by complex discrete and process industries in which the optimization of flow is paramount and where a realistic and robust model of the whole production environment may be constructed—including significant activities, processes, flows, and constraints. This modeling capability allows the planner to simulate how the entire production process operates and identify how its components interact under different conditions. This 'what-if' capability can also help the enterprise with critical business improvement efforts by simulating the consequences of each potential change.

Using these features, the present invention may reduce manufacturing cycle time and improve customer service by optimizing multi-site production plans and plant production schedules as well as identifying and optimizing production bottlenecks. Similarly, the present invention allows the user to synchronize the flow and balance of production while intelligently balancing use of production resources. Likewise, the bottleneck optimization helps to maximize throughput, material flow synchronization to reduce lead-time and inventory. The reality-based modeling helps to improve the quality and productivity of material and production plans. The present invention is sealable and flexible to maximize efficiencies while allowing integration to other products to reduce cost. Similarly, the present invention uses dynamic batch sizing to optimize flow.

In another embodiment, the present invention addresses the unique challenges of an order-based business, whether the business is make-to-order, engineer-to-order, or assemble-to-order. Designed to reduce manufacturing cycle time and improve customer service, the present invention may identify and optimize constrained resources and focuses on due-date delivery performance and Just-In-Time (JIT) synchronization of material flow. To achieve these results, the present invention uses reality-based modeling and logical constraint-based algorithms that seek to maximize bottleneck utilization and synchronize the flow of material to the customer order.

The present invention may further enable straightforward, graphical modeling of a business's entire plant, as well as the business's external resources, making the solution both more flexible and easier to implement. The modeling capabilities extend beyond traditional scheduling solutions to include production operations, material requirements, complete bill-of-materials, production tooling, production personnel, and engineering resources. Using the integration and web technology, the present invention supports real-time, plant-to-plant collaboration, and delivers seamless communication with other functional areas, including procurement, engineering, and plant management.

Thus, the present invention can help improve a business's capacity utilization and the resulting customer service while shrinking lead-time and inventory levels. By using the present invention, incremental profit may be generated through additional sales, reduced outsourcing costs, capital cost avoidance on additional equipment, productivity gains, inventory reduction, and improved asset utilization.

The present invention may reduce manufacturing cycle time and improve customer service by synchronizing multi-site production plans and single plant production schedules. Specifically, the present invention may produce realistic and robust management of resources and materials; intelligently balance the use of production and material; and rapidly simulate alternative manufacturing strategies. Other features and benefits of the present invention include synchronization of manufacturing to maximize a business's throughput; customer service optimization to improve customer loyalty; throughput velocity improvement to reduce inventory and lead-time requirements; last simulation that enables problems to be anticipated and quickly resolved; the flexibility to accurately model manufacturing environments; and the fast capacity and material analysis to create accurate manufacturing promise dates.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiment of the present invention, examples of which are illustrated in the accompanying drawings.

Glossary

Activity. One of the components of demand. The essential equivalent of a step in the utilization model. The lowest level active step or function involved in the production of an object. Each activity has requirements and relationships associated with it.

Allocation. An assignment of a resource to an activity.

Assignment. An association of a resource and an activity.

Changeover. A requirement which involves reconfiguration of a resource to change its capabilities or its nature, thereby allowing a new use or a reuse of that resource itself in a plan.

Demand. One of the basic component descriptors of the business. The demand describes the orders for products or sub-products of the business. The demand may be external, in the sense of customer orders, or it may be internal, in the sense of work in progress. The demand may be customer driven or independent of specific customer orders.

Horizon. The time interval in which scheduling may occur.

Just in time (JIT). A manufacturing process in which the objective is completed at the last possible time. JIT minimizes inventory.

Line Item. A component or one objective of an order. Every line item has a quantity, and possibly an acceptable quantity which is less than the desired quantity.

Model. A representation of a basic component descriptor of the business, or of an aspect of the business.

Objective. The goal or end result, or even an immediate result, of a sequence of operations. The objective may be the output item or product of the business, or a sub-component of the product.

Order. A specific example of demand. A designator or container for all line items. An order is complete when all of the line items contained in it have been completed.

Opportunity. A time when an activity can be accomplished and scheduled on a resource for a plan.

Plan. One of the basic component descriptors of the business. A plan is a series of events necessary to produce the objective. A plan is a schedule of how the resources are going to be tasked to meet the objective. It represents the application of the resources to meet demand. A plan involves one or more operations which are assigned specific start times, end times and resources.

Resource. A person, place or thing of the business which has a state through time, which is typically made or used by an operation.

Schedule. The assignment of one or more start times and end times to operations.

Work in process. An intermediate and incomplete state of an objective which may be transitory during the production of the objective.

Process Overview

Figure 1:
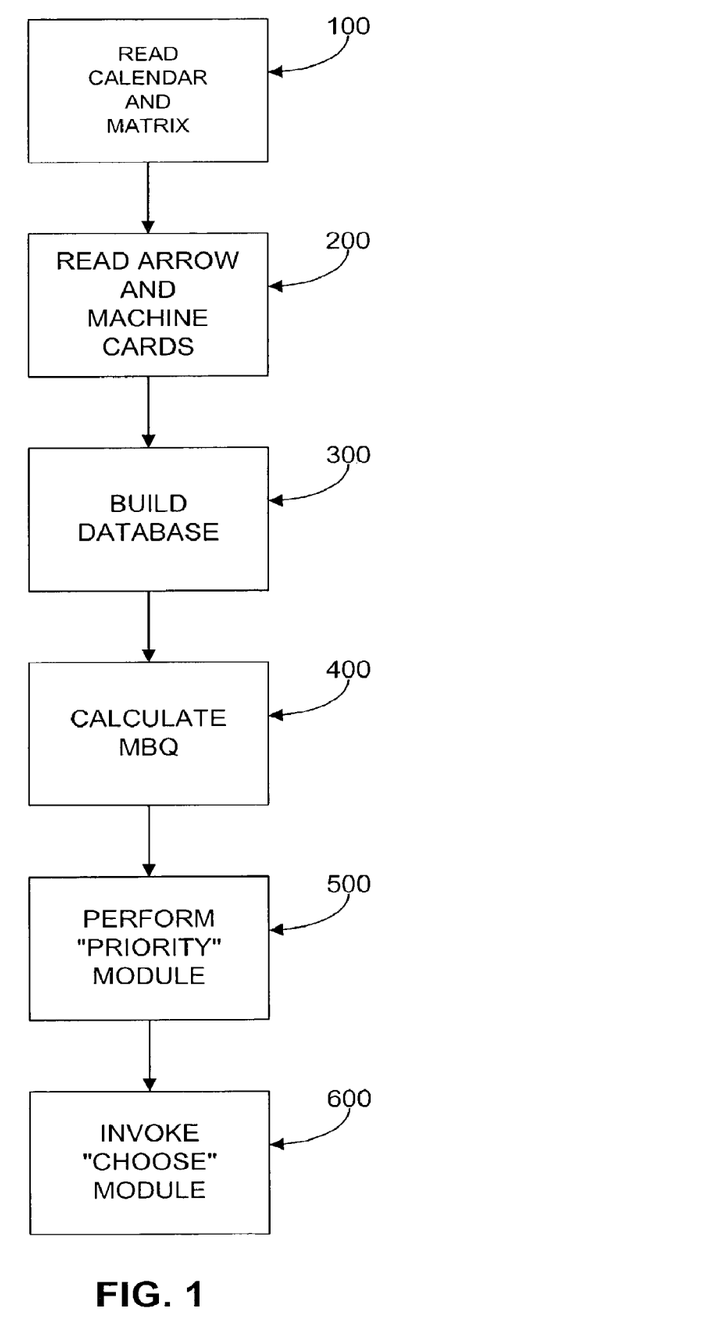
FIG. 1 is a flow diagram depicting the general steps for planning an order according to embodiments of the present invention.

FIG. 1 provides flow diagram depicting the general steps for planning an order according to embodiments of the present invention. The invention is effective because of the method by which the priorities are assigned and used to activate events according to a particular sequence. The priorities assigned to different stations (activities) determine the sequence in which each of them will have an opportunity to receive any newly released resource that has just completed its last task. The assignments so made determine the schedule that will be followed.

As shown in FIG. 1, step 100 requires the system to read a calendar and setup matrix into a computer. The calendar information includes shop operational dates, personnel availability, and the like. A setup matrix incorporates the factors (such as personnel, changeover time and additional equipment) involved in the setup and changing of individual workstations to accommodate various production activities. A fundamental concept of the present invention is to recalculate the entire set of priorities to be assigned each time there is any change in status, that is, either an activation of a resource at a particular station or the completion of a batch at a particular station. In each recalculation of the priorities, many variables are considered, including: the due dates of each of the orders in the plant; the lead time between each station and each order it feeds; the number of parts which have been done at each station; the order to which parts at a station are allocated; the existence of too much of an accumulation of stock, either at the station itself or at some successor station; and the type of setup last done with the resource to be activated at this station and the time thus saved by reactivating it here, as compared to its activation at a station having other priorities. When a dependent setup matrix is defined, all setup times given in the matrix are considered in assigning the priorities.

Flags are used to indicate the existence of a specific condition, a preference, a constraint, and the like. Typically a flag number is assigned within the system to correlate to a specific condition, preference or constraint. Flags may also be used to control the planning process. Flags are used to indicate, for example, that a scheduling opportunity is not feasible; therefore, the system needs to look at other scheduling opportunities. Other flags may be used to indicate specific constraints or preferences provided by the user.

In step 200, arrow and machine cards are read into the system to provide a description of the initial conditions of the operating facility prior to determine a schedule. Alternatively, this information can be downloaded by other means.

From the collection of data entered in the previous steps, the system conducts the step 300 of building a database for the network. The database comprises information for all the priorities established in the setup matrix that will be applied to the various resources.

Still referring to FIG. 1, in step 400 the system calculates a minimum batch quantity ("MBQ") using an explosion down the net. After completion of step 400, the system performs "PRIORITY" module 500 to identify the order[s] that rate the highest priority based on the combination of parameters identified by the user in step 300. Step 500 is followed by "CHOOSE" module 600, that evaluates the current resource availability at defined intervals and selects production routes to accomplish the highest priority orders. The "PRIORITY" module 500 is described in greater detail in FIG. 2, and the "CHOOSE" module 600 is described in greater detail in FIG. 3.

Before any assignment, the system checks the current availability of each component of the resource configuration required by the station to be activated (including the main machine, its support machine, its setup man, its auxiliary machine, one or more support machines for the auxiliary machine, possible substitute machines for each of these machines). Also checked is the availability of stock needed to activate at least one minimum batch quantity at this station.

It is the repeated checking of priorities after every single event that keeps the system from going astray too far in guiding the sequence of events. However, considering the number of variable quantities that must be checked, both for the station and for the resource configuration, the time necessary to check all of them would be prohibitive, were it not for the way these checks have been organized to keep computer processing time to a minimum. The organization of these checks will be described below.

Figure 2:
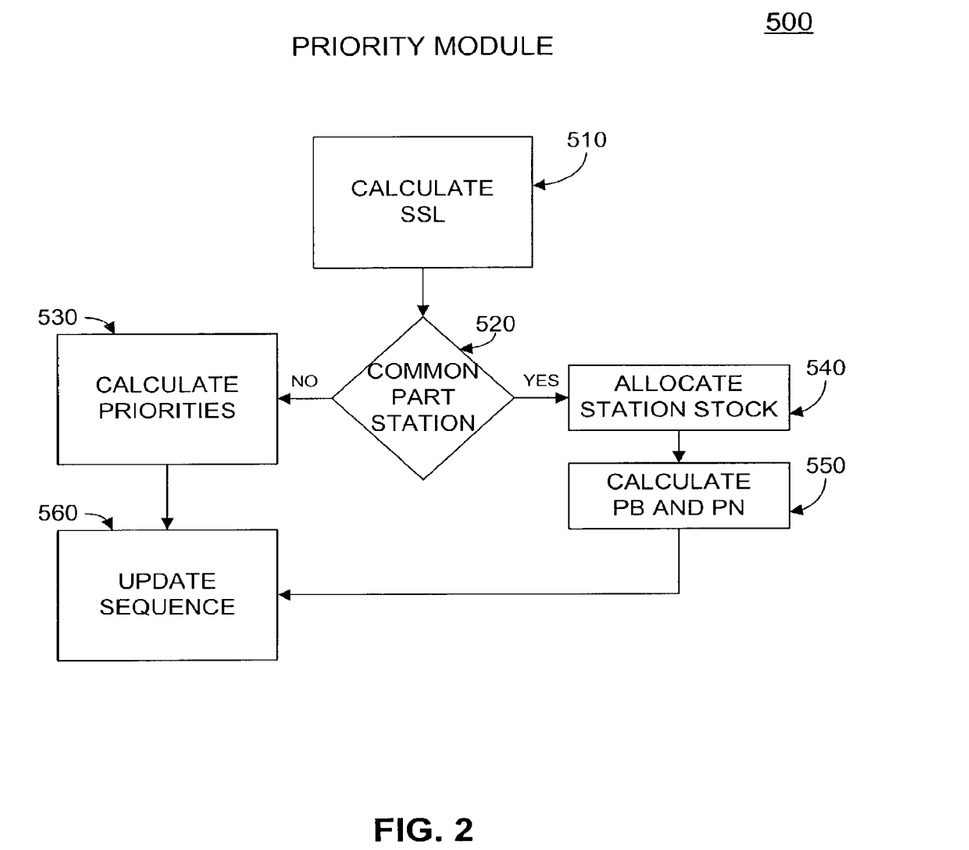
FIG. 2 is a flow diagram depicting a "PRIORITY" subroutine according to embodiments of the present invention.

Referring now to FIG. 2, "PRIORITY" module 500 is shown. Step 510 calculates the station stock limitation ("SSL") at time zero. At step 520, the system must identify common part stations. Where there are not common-part stations, step 530 calculates priorities ("PN") at each non-common part station using the following algorithm.

Basic priority, PN, is calculated using a universal function PR(t,PAF) which is an exponentially decreasing function of time as measured from the start date of planning, for any value of PAF specified.

This function is given by:

$$PR(t, PAF) = APR[(BPAF+1)(10-VK)^5]1.0E - S \text{ for } VK \leq 0$$
$$= APR[e = p(-VK^{0.45}) + BPAF * e$$
$$= p(-VK^{APAF})] \text{ for } 0 < VK < 730$$
$$= 2APRe = p(-VK^{0.45}) \text{ for } VK \geq 730$$

where VK is t, and $$APAF = 0.5 + 0.0075(PAF-9)$$

$$BPAF = e - p(-730^{0.45} + 730 APAF)$$

$$APR = 10^{(4/3)(PAF-9)}$$

Each station ("ST") is given a priority ("PN") derived using three of "ORD1," the order having the earliest due date that is fed by that ST. The first number, PC, is the value of PR(t,PAF) when t has the value of the due date of ORD1 minus the Start Date of Planning. It remains unchanged so long as ORD1 has not been completed.

The second number, PA, is the lead time ("LT") from ST up to the order fed by ST having the longest LT ("OMAX"). PA is the calculated LT from ST to OMAX to produce the order quantity, using maximum overlap between successive stations, and assuming only one resource per station, always available when needed. (If the resource has MF=S, then its time per batch ("TPB") is considered to be S times larger, in order to represent the fact that it is likely to be unavailable most of the time.) Thus, PA is given by:

$$PA = \text{Sum over all stations from } ST \text{ up to } OMAX \text{ of } (TPB + SO + SUT) +$$
$$\text{Order Quantity} * TPP \text{ of the station on this path having the largest}$$
$$TPP + 4 * TPB \text{ of each station served by a machine with } MF = S$$

PA will remain unchanged until OMAX is completed. Thus, as long as the system carries a counter showing how many parts remain to be produced for ORD1, there is no change in these two quantities PC and PA, so they need not be recalculated after each event (in fact, PA will change at completion of ORD1 only when ORD1=0 MAX).

The third number PB is used to represent the combined effect of constrictions in the flow of material from ST to all the orders that it feeds. As station stock ("SS") builds up at ST, its priority is lowered by a factor R(ST), where $$R(ST) = [(SSL-SS)/SSL]^{2(PAF+S)/S}$$

feeding ST0, PB(ST1)=PB(ST0)*R(ST1). Its predecessor ST2 has PB(ST2)=PB(ST1)*R(ST2), and so forth. When there is more than one head station ("HS") for ST, then the calculation of PB(ST) is more complex. It will depend on the status of the SS at each station. If all of the SS is allocated to one or more of the head stations ("HSi"), then PB(ST) is $$PB(ST) = \text{Sum over } i \text{ of } PB(HSi)*PXP(HSi)$$

where PB(HSi) is the value of PB at HSi before allocation stock at ST, and PXP is defined as $$PXP(HSi) = PR2(HSi)/PR1(HSi)$$

where PR1(HSi) is the present value of the priority calculated from HSi (see below), before allocation to any HS of stock at ST and PR2(HSi) is the priority for HSi after allocation of SS at ST. PR2(HSi) is defined by $$PR2(HSi) = PR1(HSi)*(INT-FSTT)2*PFAX$$

and FSTT is the amount of SS allocated to HSi. PFAX is (PAF+S)/S.

If there remains SS at ST after allocation to all its HSs, then PB(ST) is reduced by the factor PSS, where $$PSS = [(SSL-SS)/SSL]2$$

and, if SS>SSL, then PSS=0.

Since PB is a sum leading to many orders, each with its own PC as the first factor, PB may be larger than PC, which always relates only to a single order. However, the R factors which follow each PC can reduce PB to the point where it is lower than the value of PC.

The overall priority is found by taking the smallest of the two values PC and PB, calculating tB, the corresponding value of t, shifting it by the lead time PA and setting $$PN = PR(t-PA, PAF).$$

The calculation of the counter mentioned above, giving the number of completed parts at ST to be allocated to each order fed by ST, is rather complex and time consuming. After the completion of an MBQ at ST which is sufficient to cover the needs of ORD1, the system recalculates (a) the order fed by ST with the next highest PN, (i.e. the new PC); (b) the amount to be allocated (the new counter) for the candidate which has the earliest due date; and (c) when OMAX=ORD1, the new lead time (the new PA).

The above calculation is done via an implosion upwards from ST towards all the orders, to see which orders are being fed by it and also to see how the stock is being allocated. This is followed by an explosion downwards to ascertain the actual quantity needed at ST for its ORD1, the order which has the earliest due date (and therefore, the highest PC value).

Returning back to FIG. 2, when a station is a common part station, the system performs the step 540 of allocating station stock at common-part stations and then performs the step 550 of calculating PB and PN for them, according to the same calculations used in step 530.

Once a batch has started, the system will perform a new scheduling decision at the end of each period of common working time defined by the user. The period of common working time need not be associated with a batch completion. Using a personnel scheduling mechanism, only "support" and "set-up man" resources will be released at the end of the period of common working time. The main machine and/or substitute for that workstation will not be released, because there is a strong likelihood that a set-up cost would be incurred. The auxiliary resources will also not be released. In theory, auxiliaries were designed for jigs of the main machine. The assumption is that "support" and "set-up man" resources are people and can be interchanged during a batch without penalties, except for efficiency ratio calculations.

A saving in calculation time is achieved by recognizing that when a station is activated or its activation is completed, only the priority of itself and its predecessors need to be recalculated. Thus, the priorities of the vast majority of the stations do not need to be recalculated each time.

Another calculation time saving is achieved by recognizing that when the system finds that a recalculated value is unchanged, all values for stations predecessor to it need not be recalculated since they will also necessarily remain unchanged.

Whenever the station stock ("SS") becomes greater (or even just equal) to the calculated SSL of that station, its PN value is changed to S, (3.0E-38), and the station is then in "stop" status. In "stop" status, the station is not allowed to be activated. When two stations in a route are in the status "stop," then PN is set to a value zero (i.e., "halt") and neither these two stations nor any of the predecessors of the second station may be activated in order to feed these two stations (though predecessors feeding these two plus others not in "halt" status will not be constrained to "halt" status.)

Although all stations are potentially prospects for activation, only those stations having at least one MBQ of stock available for consumption and a PN greater than S can be activated. All other stations are excluded from consideration.

Finally, after either steps 530 or 550 of FIG. 2 are completed, step 560 is to update subqueues. Those stations with adequate stock to be activated and with PN greater than S are all placed in a queue in the sequence of their PN numbers. Each station in the queue is placed in a subqueue (in priority sequence) of all stations whose main machines are the same. The highest priority station at the head of any subqueue is examined to see whether it may be assigned. If its machine configuration (except for the auxiliary) is not available, then this subqueue need not be interrogated further until a new event has occurred. Therefore the system will next check the station, at the head of a different subqueue, with the next highest priority. This procedure is repeated until a subqueue is found with its required resources or an appropriate substitute available.

Figure 3:
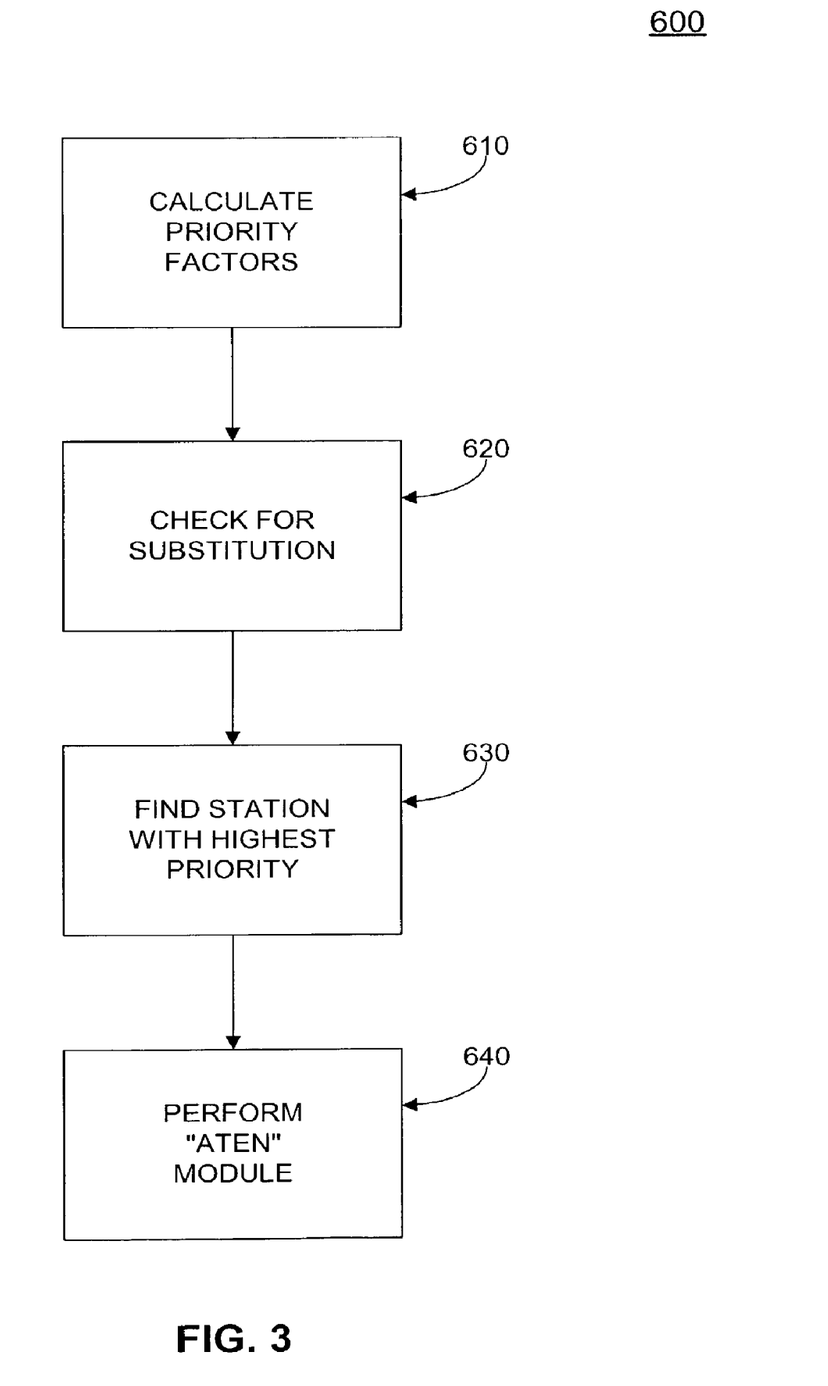
FIG. 3 is a flow diagram depicting a "CHOOSE" subroutine according to embodiments of the present invention.

Referring now to FIG. 3, "CHOOSE" module 600 is shown. Step 610 calculates priority factors F1 and F2, as well as F3, F4 and tnew when there is a setup matrix, to get correct relative priorities within the subqueues. Upon finding a subqueue with available resources, the system will search the stations in the subqueue to assure that setup time is not needlessly lost. Each main machine resource carries with it the knowledge of the last setup which was done by it, until it is successfully reassigned.

When there is no dependent setup matrix, the station in the subqueue which last completed a batch ("STLC") using this resource and thus needs no setup if this resource is used again, will have its PN number raised by two factors F1 and F2, such that its new priority PS will be given by $$PS = PN*F1*F2 = 1.5(1+0.1SUT)PN*F2$$

where the "SUT" is the setup time (in hours) which would be lost if a different station is activated.

The second factor, F2, is introduced to give some weight to having the current resource finish all the parts needed for the order it is currently working to complete before starting on parts for another order. This preference is enhanced as the remaining parts to be completed are reduced. F2 is given by $$F2 = LT/(TPP*RPD)$$

where "LT" is the lead time to the order currently being worked for and "RPD" is the remaining parts to be done to complete the parts needed at this station for that Order (RPD is never made less than an MBQ). F1*F2 is limited to be within the upper and lower bounds 1.732<F1*F2<1732.

When there is a setup matrix, all the stations in the matrix which are in the subqueue, except STLC, will also have their PN numbers changed to PS so as to enhance the choosing of stations in a sequence which is the preferred progression along the matrix elements. The change of priority is calculated similarly to the way the lead time is found. The new priority (for all the stations except STLC) is changed to PS where $$PS=PR(tnew,PAF)*F3$$

and where $F3$=(the sum of the matrix elements in the column of the STLC) divided by (the sum of the matrix elements in the row of the candidate for activation)

Actually, each row and column are for a group of stations with the same setup characteristics called a matrix setup group ("MSG"). Thus, strictly, we could refer above to the MSG of the STLC, etc.

The new time argument, tnew, is the original value of t of the old PN plus the setup time (in days) times a factor F4

$$tnew=t+SUT*F4$$

where $$F4=([(DS+0.01)/PAF]^{(PAF+5)/5})8A*3.1416$$

where the added priority from saving a setup can no longer lift it above the priority level of the station at the head of the subqueue. Then the station with the highest total priority (including that due to setup) is ready for assignment. The above procedure keeps to a minimum the number of checks that need be made before each assignment.

At step 620, the system checks for substitutions as needed. At step 630, the system finds the station from the subqueues that has the highest priority and has the full resource configuration needed to load it at the time module 600 was invoked.

At step 640, the system calls "ATEN" module to load the station found. The "ATEN" module of step 640 is described in further detail in FIG. 4, which is next discussed.

Figure 4:
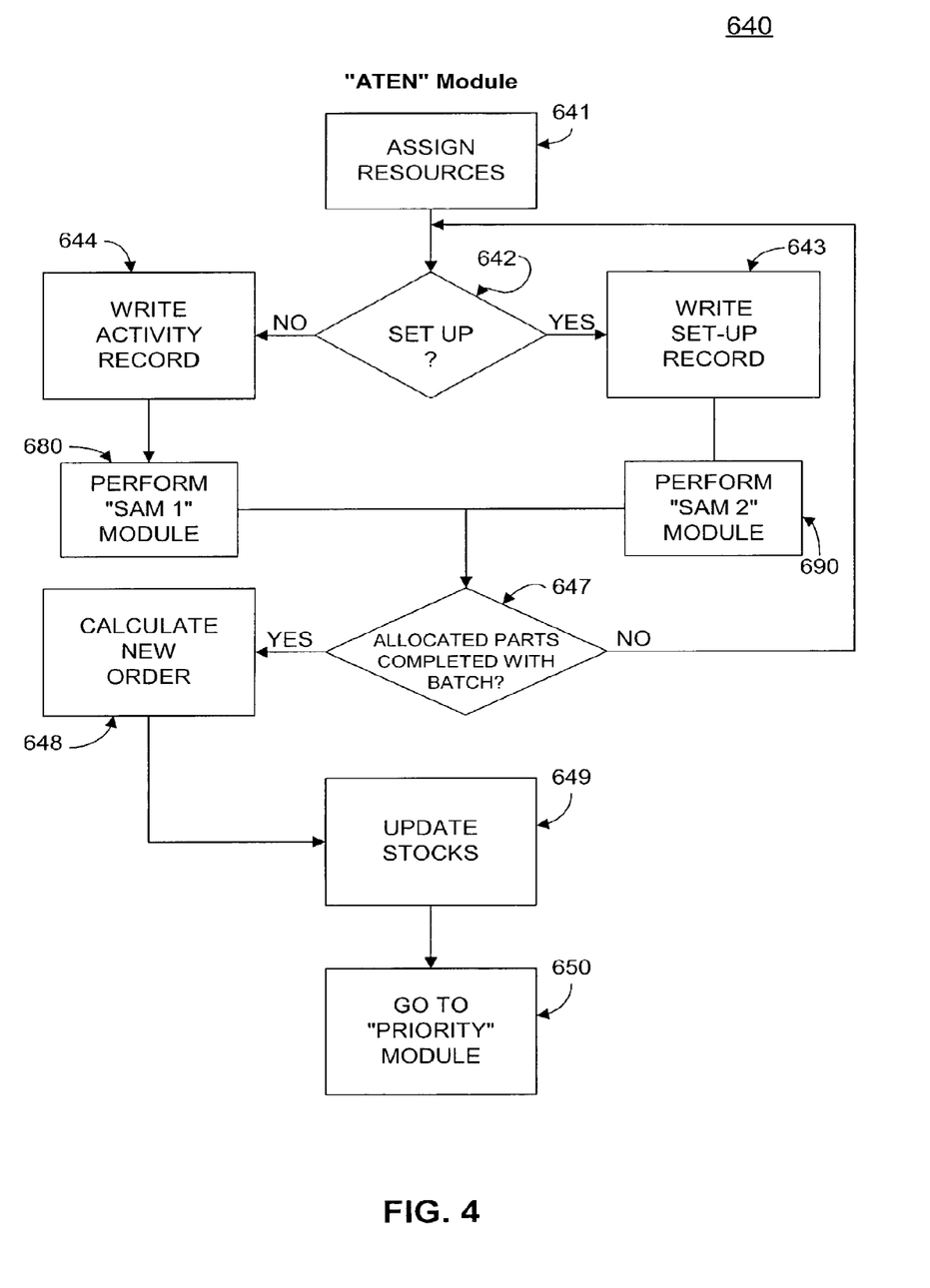
FIG. 4 is a flow diagram depicting a "ATEN" subroutine according to embodiments of the present invention.

The system, in step 641 of FIG. 4, assigns resources required. The system then looks in step 642 to determine if any setup of the assigned stations is required.

When there is no setup necessary, step 644 writes an activity record to an intermediate holding table and invokes, at step 680, the "SAM 1" module at the end of the activity. "SAM 1" module 680 is described in further detail in FIG. 5. When there is setup required, step 643 writes the setup record to the intermediate holding table and invokes the "SAM 2" module 690 at the end of the setup. "SAM 1" module 690 is described in further detail in FIG. 6.

Following the completion of either step 680 or 690 of FIG. 4, at step 647, the system looks at the activity just loaded to see whether the parts allocated for the most urgent order ("PC") will be completed with this batch. If yes, the system performs step 648, which calculates the new order to be viewed as most urgent, thus changing PC, and PA when the most urgent order is also the one with the longest lead time from this station. If PC will not be complete with this batch, the system cycles and checks again at the completion of the next batch. After the new order is calculated, at step 649 the system updates stock taken from the predecessor at activation and goes back 650 to step 500 (FIG. 1).

Figure 5:
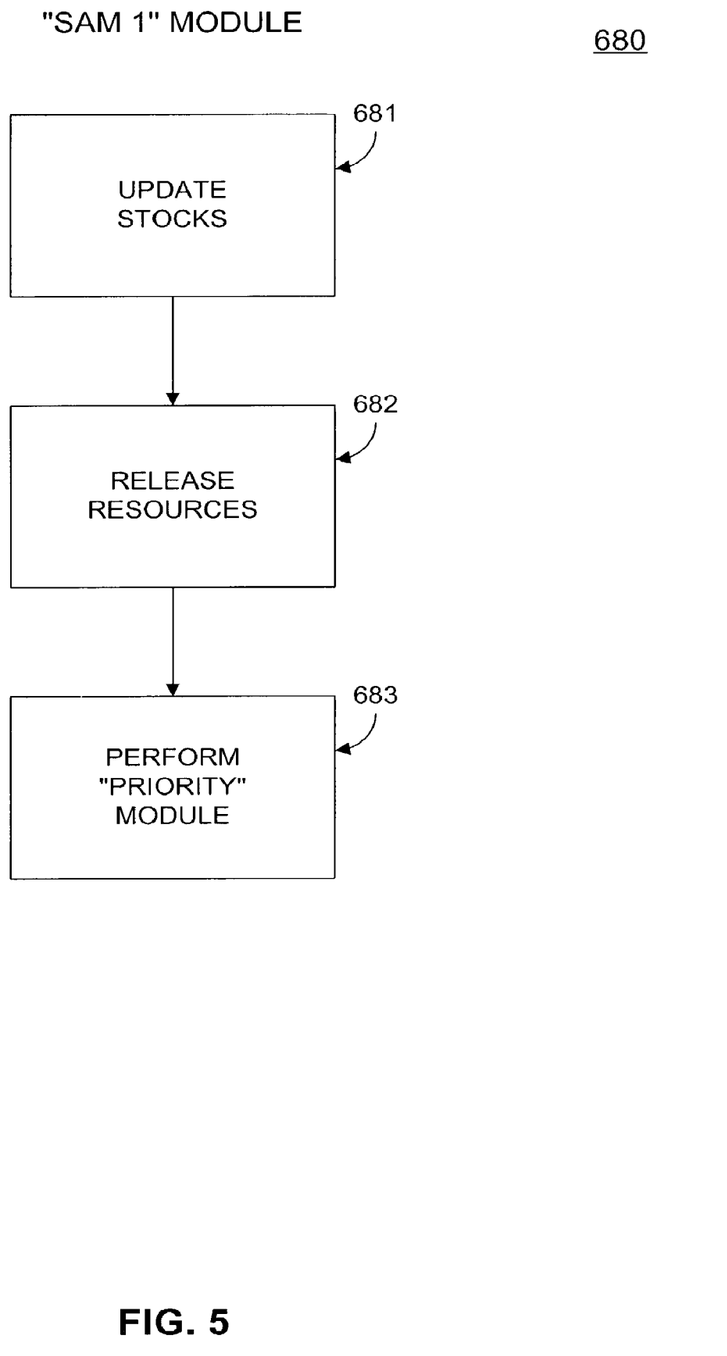
FIG. 5 is a flow diagram depicting a "SAM 1" subroutine according to embodiments of the present invention.

FIG. 5 is a flow diagram depicting "SAM 1" subroutine 680 and is used after the system identifies activity with no setup and writes an activity record. At step 681, the system will update stock just completed. Then, at step 682, the system releases resources. After the resources have been released, in step 683, the system takes the sequence back to step 500 (FIG. 1) to update priorities.

Figure 6:
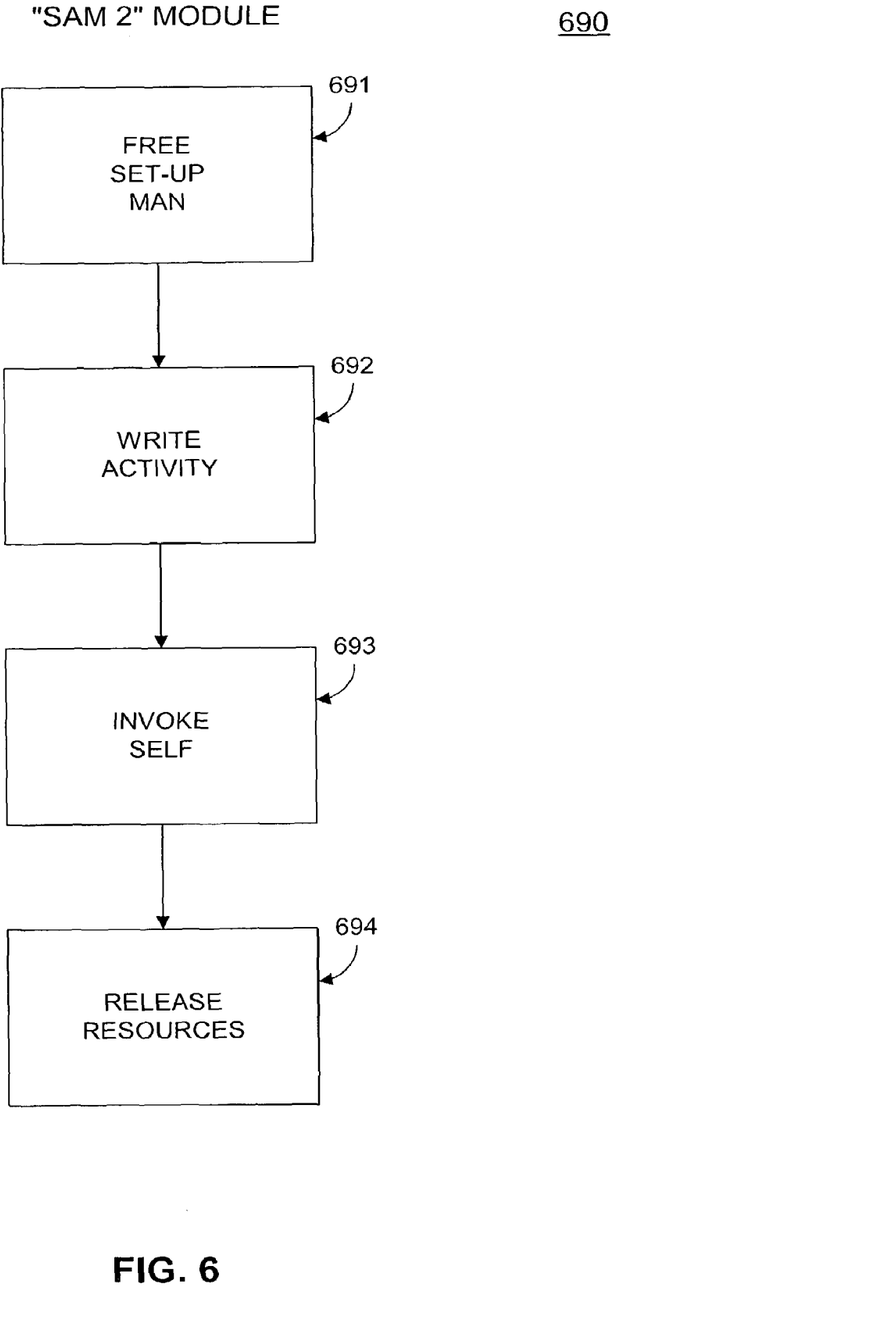
FIG. 6 is a flow diagram depicting a "SAM 2" subroutine according to embodiments of the present invention.

FIG. 6 is a flow diagram depicting the "SAM 2" subroutine 690 and is used after the system writes a set-up record. In step 691, the system frees the setup man. At step 692, the system writes the activity record to an intermediate holding table and then, at step 693, invokes itself at the end of the activity. In step 694, the system releases resources at the end of the activity, putting stations that had setup in the queue of "setup" stations.

Figure 7:
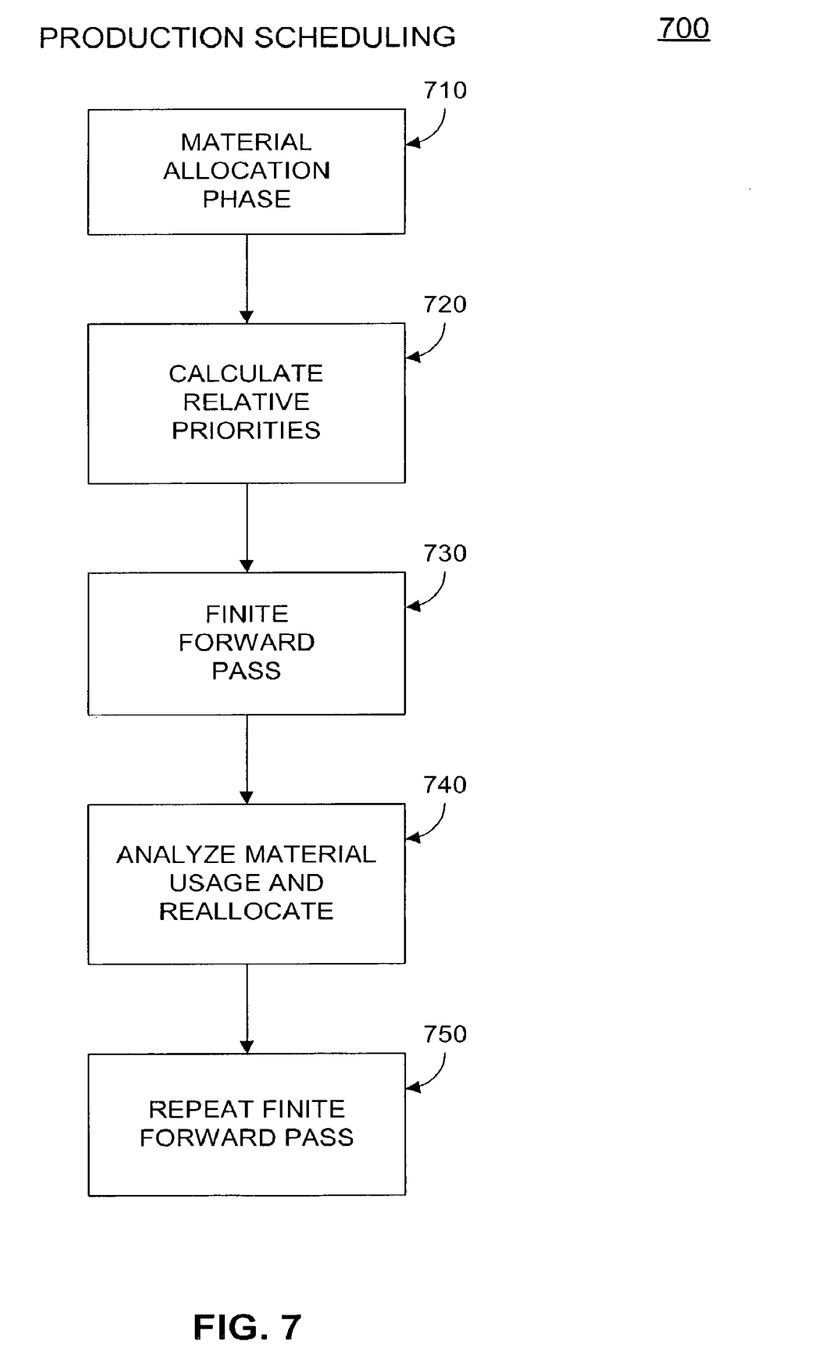
FIG. 7 is a flow diagram depicting the general steps for scheduling an order according to embodiments of the present invention.

Referring to FIG. 7, in scheduling an order according to the present invention an order can be scheduled in three, but optionally five, passes. The process begins with material allocation phase 710, which does a top-down pass, in descending priority of independent demand (earliest due date first +/−priority shift), allocating on-hand supplies and known arrivals of critical materials. The output of this phase is the list of activities that need to be scheduled with the correct net quantities.

At the next step 720, the system calculates the relative priorities of all activities to be scheduled. The priorities are also the earliest permission to start date of each activity. The priorities are based on potential resource capacities in buckets of one minute or greater (the "resolution"). The processing is top-down in increasing priority of independent demand, from the back of the order list going forward.

In step 730, conduct a finite forward pass, doing exact resource loading and calculating exact available dates. The scheduled date for a demand will be different from its due date if the rough-cut lead time calculations do not match the actual lead times due to increased accuracy or set-up optimization, or if the dates calculated during the top-down explosion entered negative time.

A working days parameter is included which decides whether an "activity slack" in the schedule is to be counted in calendar working days or calendar real days. If working days are selected, then activity times will be counted in working days against actual days. Thus, for example, an input for a six working day material lead time will typically be accounted for in the system as an actual eight calendar day period, assuming Saturdays and Sundays are considered non-working days. The system can then schedule queues of activities that can be scheduled in front of lead times on the basis of actual calendar days.

The system can also accommodate modeling of tank resource functionality. Unlike most other resources where the resource is released once the process time has completed, a tank resource is consumed until the successor activity releases it. Therefore, if the successor stage is a bottleneck, the tank is consumed during the queue time. It also is constrained by its volume (in a similar way as an oven).

Tank resources are modeled using a maximum capacity (e.g., volume), with resources assigned a volume per part in the same measuring unit as that of the maximum capacity. Batches with the same flag number may be processed in the same tank at the same time. A batch is an order (or a sub-order) quantity. Set-up matrices can be used to define the change over time between each flag, e.g., preferential set-up sequences. Activation of the tank is triggered when enough batches have accumulated so that the tank is filled to at least to a pre-defined minimum volume (Vi). Vi can be set to zero (or set to default to zero absent other user input), so that the tank can be activated whenever a batch is ready. When other batches are available, the system will seek to enter the other parts that will fit within the remaining available maximum capacity in order of their own priorities. When the tank capacity is smaller than a batch, smaller quantities filling the tank are processed until the entire order is done. When several tanks are available, the smaller quantities can be done in parallel. For any particular order, the user can define whether or not they want to be able to split an order over multiple tank activities. Selecting to split orders allows the schedule to split an order to maximize the usage of the available tank capacity. If the option to split is not selected, an order will not be split. This means that if a tank does not have enough to capacity to hold a full order, the order will be delayed until a tank that has enough capacity to hold the whole batch is available. A substitute tank will be called to do a batch of parts when the preferred tank is unavailable. The system takes account of the difference in capacity between the preferred tank and its substitute.

The system also includes a junction raw material ("JRM") parameter option to prevent the launch of materials and subsequent activities unnecessarily early. This parameter not only serves to keep work in progress to a minimum, but also enables resources to work on other activities. The JRM parameter is applicable when a material required for an activity to be scheduled is not available. Other legs of the junction are not processed until they will coincide with the arrival of the late material.

A T-plant parameter option is available to minimize lead time. Manufacturing plants where finished goods have long lead times may still wish to respond to firm customer orders within a relatively short lead time. In T-plant environments, for example assembly houses, many products have several common parts, which diverge only towards the end of the net. In this situation, in order to minimize lead times, rather than forecast against finished goods, it would be sensible to produce according to forecast to the point(s) where commonality is finished. Then produce from this point only for firm customer orders. An extreme example of this strategy could be to purchase only the raw material by forecast to the items that use it (because of very long lead times) but not start production (which has relatively short production lead times) until a firm order is in place. This approach will enable reduced lead time and increased customer service, while preventing unnecessary WIP.

Step 740, is an optional fourth pass that analyzes material usage and reallocates stocks and arrivals of critical materials from high priority activities that did not consume them until a later date to lower priority activities that have been delayed by lack of a material. If pass four 740 is performed, then it is followed by step 750, which repeats a finite pass similar to step 730 to determine the effect of the material reallocation.

It will be apparent to those skilled in the art that various modifications and variations can be made in the system of the present invention without departing from the spirit or scope of the invention. Thus, it is intended that the present invention covers the modifications and variations of this invention provided that they come within the scope of any claims and their equivalents.

The invention claimed is:

1. A computer-implemented method for deriving at least one plan for scheduling a use of at least one available human and non-human resource to satisfy one or more demands for goods or services comprising the steps of:
describing an environment which models and represents the at least one available human and non-human resources and at least one alternative methodology for utilizing said at least one available human and non-human resources;
describing each of said at least one available human and non-human resources and a capacity of each of said at least one available human and non-human resources;
describing a utilization structure which describes use and constraints of said at least one available human and non-human resources;
defining each of said demands as one or more orders where each of the orders has one or more line items;
scheduling said demands according to a set of possible plans based upon the environment, wherein activities can be counted in calendar working days or calendar real days, and wherein the set of possible plans contains a plurality of possible plans; and
evaluating, by a computer and through the use of dynamic prioritization, and based on common part station information and not common part station information, by a priority module, each possible plan of said set of possible plans for the purpose of at least one of accepting the plan because it is desired to be implemented and rejecting the plan and initiating steps for creating a new plan.

2. The method according to claim 1, wherein the step of evaluating each possible plan comprises the steps of:
inspecting a relationship between a selected plan and each of said demand and said at least one available human and non-human resource, including resources used for executing the selected plan;
determining whether the demand is satisfied;
comparing the demand to the at least one available human and non-human resources which will be used for executing the selected plan; and
determining whether the selected plan is satisfactory based in part on results of one or more of said steps of inspecting the relationships, determining whether demand is satisfied, and comparing the demand to the resources.

3. The method according to claim 2, wherein said resources comprise tank resources.

4. The method according to claim 2, wherein said scheduling includes at lest one of delaying and reassigning a launch of raw materials to support an order such that said launch will coincide with an arrival of another late material.

5. A system for deriving at least one plan for scheduling a use of at least one available human and non-human resource to satisfy one or more demands for goods or services comprising:
means for describing an environment which models the at least one available human and non-human resources and at least one alternative methodology for utilizing said at least one available human and non-human resources;
means for describing each of said at least one available human and non-human resources and a capacity of each of said at least one available human and non-human resources;
means for describing a utilization structure which describes use and constraints of said at least one available human and non-human resources;
means for defining each of said demands as one or more orders where each of the orders has one or more line items;
means for generating a priority for each said at least one non-human resource;
means for scheduling said demands according to a set of possible plans based upon the environment and a comparison of said priorities, wherein activities can be counted in calendar working days or calendar real days, and wherein said set of possible plans includes at least first and second possible plans; and means for evaluating, by a computer and through the use of dynamic prioritization, and based on common part station information and not common part station information, each possible plan of said set of possible plans for the purpose of at least one of accepting at least the first possible plan included in the set of possible plans because it is desired to be implemented and rejecting at least the second possible plan and initiating steps for creating a new plan.

6. The system according to claim 5, wherein means for evaluating each possible plan comprises:
means for inspecting a relationship between a selected plan and each of said demand and said at least one available human and non-human resource, including resources used for executing the selected plan;
means for determining whether the demand is satisfied;
means for comparing the demand to the at least one available human and non-human resources which will be used for executing the selected plan; and
means for determining whether the selected plan is satisfactory based in part on results of one or more of said steps of inspecting the relationships, determining whether demand is satisfied, and comparing the demand to the resources.

7. The system according to claim 6, wherein said resources comprise tank resources.

8. The system according to claim 6, wherein, said scheduling means includes means for delaying or reassigning the launch of raw materials to support an order such that said launch will coincide with the arrival of another late material.

9. A system for deriving at least one plan for scheduling a use of available resources to satisfy one or more demands for goods or services comprising:
a module for describing an environment which models the at least one available human and non-human resources and at least one alternative methodology for utilizing said at least one available human and non-human resources;
a module for describing each of said at least one available human and non-human resources and a capacity of each of said at least one available human and non-human resources;
a module for describing a utilization structure which describes use and constraints of said at least one available human and non-human resources;
a module for defining each of said demands as one or more orders where each of the orders has one or more line items;
a module for defining the priority of each at least one non-human resource;
a module for scheduling said demands according to a set of possible plans based upon the environment and a comparison of said priorities, wherein activities can be counted in calendar working days or calendar real days, and wherein said set of possible plans includes a plurality of possible plans; and
a module for evaluating, by a computer and through the use of dynamic prioritization, and based on common part station information and not common part station information, each possible plan of said set of possible plans for the purpose of at least one of accepting a first plan included in the set of plans because it is desired to be implemented and rejecting the first plan and initiating steps for creating a new plan.

10. The system according to claim 9, wherein said evaluating module comprises:
a module for inspecting a relationship between a selected plan and each of said demand and said at least one available human and non-human resource, including resources used for executing the selected plan;
a module for determining whether the demand is satisfied;
a module for:
comparing the demand to the at least one available human and non-human resources which will be used for executing the selected plan; and
determining whether the selected plan is satisfactory based in part on results of one or more of said steps of inspecting the relationships, determining whether demand is satisfied, and comparing the demand to the resources.

11. The system according to claim 10, wherein said resources comprise tank resources.

12. The system according to claim 10, wherein, said scheduling module includes delaying or reassigning the launch of raw materials to support an order such that said launch will coincide with the arrival of another late material.

13. A non-transitory program storage device readable by a machine, tangibly embodying a program of instructions executable by a machine to perform the steps of deriving at least one plan for scheduling a use of available resources to satisfy one or more demands for goods or services, comprising the steps of:
describing an environment which models the available human and non-human resources and alternative ways to utilize said resources;
describing each of said available resources and a capacity of each of said available resources;
describing a utilization structure which describes the use and limitations on use of substantially all of said available resources;
defining each of said demands as one or more orders where each of the orders has one or more line items;
generating a priority for each said at least one non-human resource;
scheduling said demands according to a set of possible plans based upon the environment and a comparison of said priorities wherein activities can be counted in calendar working days or calendar real days and wherein said set of possible plans includes a plurality of possible plans; and
evaluating, through the use of dynamic prioritization, and based on common part station information and not common part station information, each possible plan of said set of possible plans for the purpose of either (a) accepting the plan because it is desired to be implemented, or (b) rejecting the plan and initiating steps for creating a new plan.

14. The program storage device according to claim 13 wherein the step of evaluating each possible plan comprises:
inspecting the relationship between the selected plan and each of said demand and said resources, including what resources will be used in executing the plan;
determining whether the demand is adequately satisfied;
comparing the demand to the resources which will be used in executing the plan; and
determining whether the plan is satisfactory based in part on results of one or more of said steps of inspecting the relationships, determining whether demand is satisfied, and comparing the demand to the resources.

15. The program storage device according to claim 14, wherein said resources comprise tank resources.

16. The program storage device according to claim 14, wherein, in said step of scheduling said demands, said scheduling includes delaying or reassigning the launch of raw materials to support an order such that said launch will coincide with the arrival of another late material.

* * * * *